J. E. WARD.
RETAINING SPRING FOR GASKETS.
APPLICATION FILED OCT. 29, 1909.
951,584.
Patented Mar. 8, 1910.
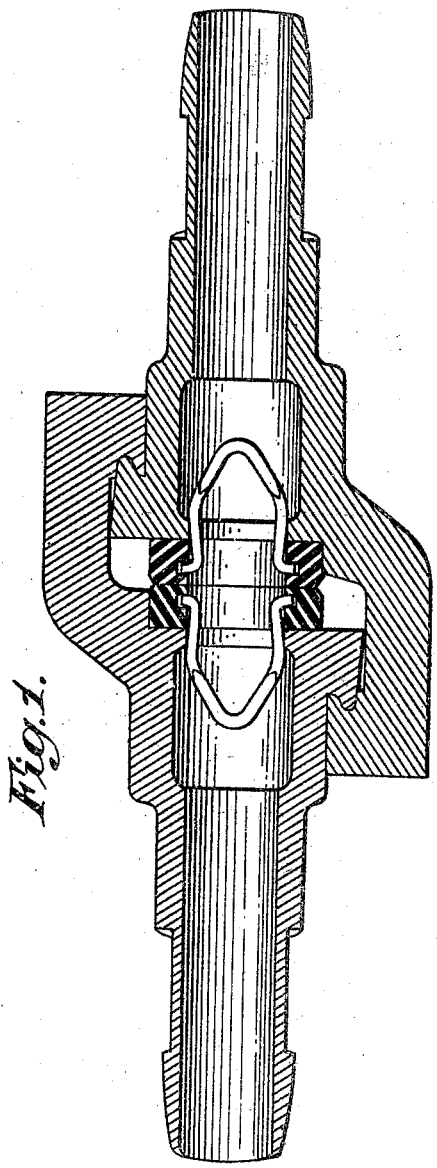
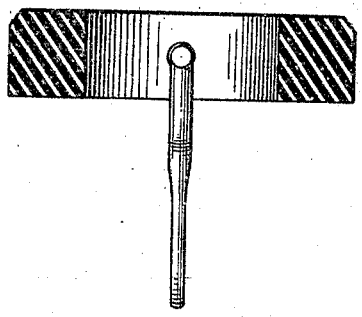
Attest:
Inventor:
John E. Ward

UNITED STATES PATENT OFFICE.

JOHN E. WARD, OF NEW YORK, N. Y.

RETAINING-SPRING FOR GASKETS.

951,584.  Specification of Letters Patent.  Patented Mar. 8, 1910.

Application filed October 29, 1909. Serial No. 525,289.

*To all whom it may concern:*

Be it known that I, JOHN E. WARD, of the borough of Manhattan of the city of New York, in the county and State of New York, have invented certain new and useful Improvements in Retaining-Springs for Gaskets, of which the following is a specification, reference being had to the accompanying drawings, forming a part hereof.

Gaskets for hose couplings are commonly provided with retaining springs each consisting of a length of wire bent into some suitable form to engage the sides of the opening in the coupling head, and the ends of which are inserted in the gasket. I have found that a V-shaped spring of this type is admirably suited to the purpose, requiring as it does a minimum of material and a minimum of bending in its manufacture, and offering, when in position in the coupler-head, a minimum of obstruction to the passage of steam, air or other fluid employed in the system.

In accordance with the present invention, I provide these springs with a much greater resilience for the thickness of metal used, by flattening the metal, as I will now proceed to describe.

In the drawings, Figure 1 is a view in longitudinal central section through a coupling containing a pair of gaskets held in place by V-shaped springs in which the invention has been embodied, and, Fig. 2 is a view, on an enlarged scale, showing a section through one of the gaskets at right angles to the plane of Fig. 1.

The coupling shown in the drawings is of the type known as the "reversible coupling" in which each coupling head, *a* and *b*, is exactly alike, being provided with a so-called "toe" *c* and "heel" *d* which coöperate in the manner shown to connect the two coupling heads together.

Between the abutting faces of the two coupling heads, as appears in the drawing, are two gaskets, one belonging to each coupling head and being retained therein by a V-shaped-spring *u* so that when the heads are separated the gaskets will remain fast against the respective faces of these heads. The ends of the wire pieces which form the V-shaped springs will be seen to enter the interior walls of the gaskets, being bent over for this purpose, and each wire piece is formed so that its side members bulge slightly in order that it may engage the sides of the opening in the corresponding head of the coupling. When the springs have been thus formed they may be inserted into their gaskets where they will be retained by their resiliency. In order, however, to greatly increase the resiliency and thus to enable this form of spring to hold the gaskets more firmly in position, the metal of the springs is flattened at the apex. This so-called flattening is effected in the plane of the spring and extends for a short distance on either side of the apex of the spring. As will be seen, this flattening increases the metal in the plane of bending at the apex of the spring and thus makes the spring resist bending to a much greater extent. This flattening may be produced in any suitable manner, preferably by hammering the springs.

It will be understood that the improvements may be applied to other springs than are shaped like a V, as the invention, broadly considered, consists in increasing the resiliency of these springs by flattening the metal at the points of bending.

I claim as my invention:

1. A V-shaped gasket retaining spring flattened at its apex.

2. A V-shaped gasket retaining spring having its sides bulging to engage the sides of the opening in a coupler head and having its apex flattened to increase its resiliency.

3. A V-shaped gasket retaining spring flattened at its apex in the plane of the spring.

This specification signed and witnessed this 28th day of October, A. D., 1909.

JOHN E. WARD.

Signed in the presence of—
G. McGRANN,
LUCIUS E. VARNEY.